AUTOMATIC CARD-DIALER TELEPHONE WARNING DEVICE

Filed May 8, 1964 2 Sheets-Sheet 1

INVENTOR.
Joseph E. Hynes
BY John A. Hamilton
Attorney.

AUTOMATIC CARD-DIALER TELEPHONE WARNING DEVICE

Filed May 8, 1964 2 Sheets-Sheet 2

INVENTOR.
Joseph E. Hynes
BY John A. Hamilton
Attorney.

3,345,463

AUTOMATIC CARD-DIALER TELEPHONE WARNING DEVICE

Joseph E. Hynes, 3117 W. Barker Circle, Kansas City, Kans. 66104
Filed May 8, 1964, Ser. No. 365,969
12 Claims. (Cl. 179—5)

ABSTRACT OF THE DISCLOSURE

This application discloses a device operable to initiate a telephone call from any first station to any predetermined second station in response to nearly any emergency condition which may occur at the first station, in order to give warning of the emergency at the second station. It is specifically designed for use with a "card dialer" telephone instrument at the first station. It may be set to give only one warning call, to repeat the calls at intervals as long as the emergency condition persists, or to continue the calls at intervals even if the emergency condition ceases to exist, and in the latter cases can be shut off by the utterance of a distinctive sound at the second station. It can transmit a distinctive sound to the second station, in order to identify the source of the call, and can permit the listener at the second station to listen to sounds at the first station, but remote from the telephone instrument.

Figures 1, 2, 3, 4, 5, 6, 7:
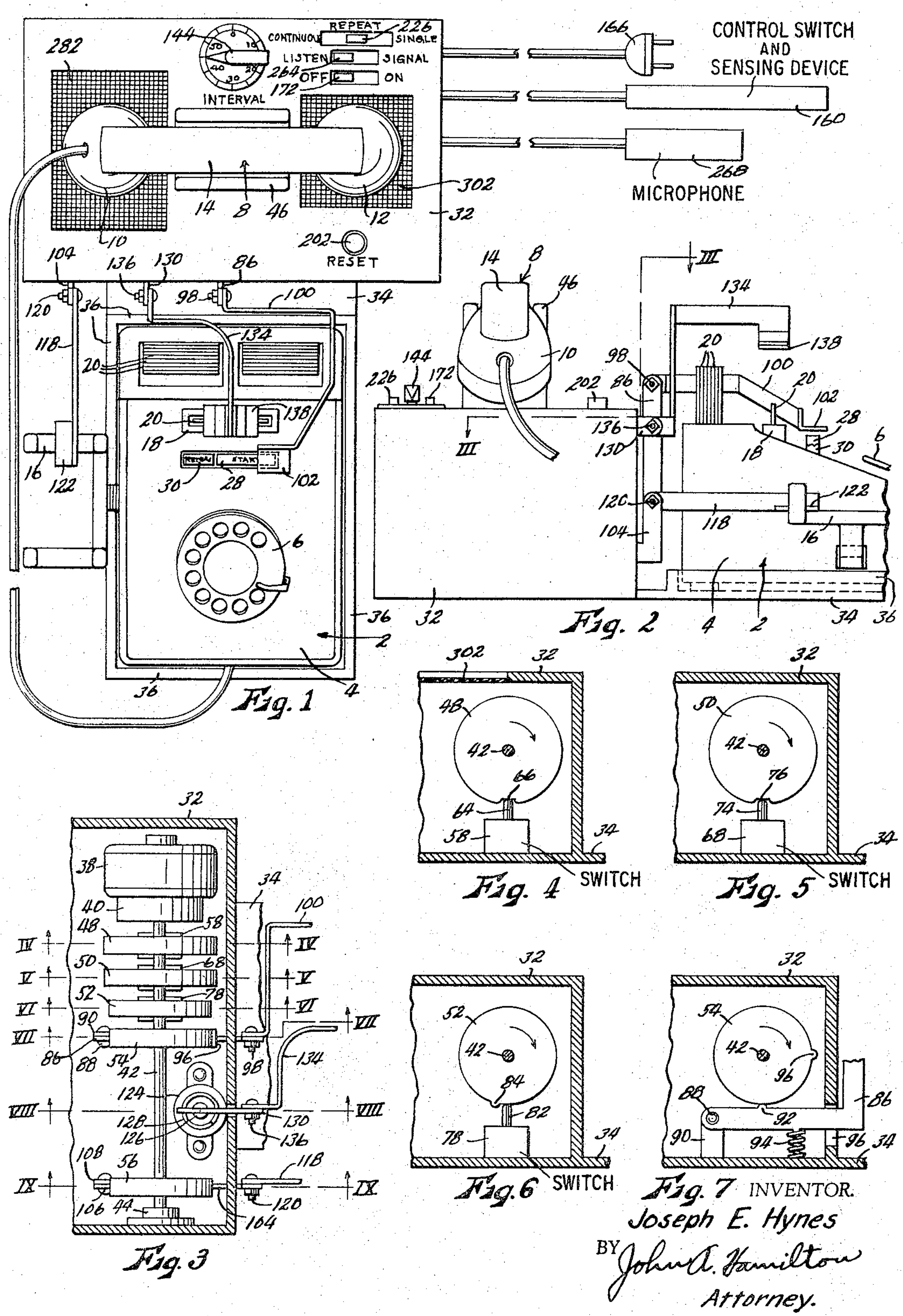

This invention relates to new and useful improvements in telephone warning devices, and has as its principal object the provision of a device adapted to be used in connection with a telephone, and operable in response to any emergency condition, or any other condition requiring attention, to initiate a telephone call to any pre-arranged number, whereby to notify the receiver of the call of the occurrence of the emergency. Specifically, the device was actually designed for use in a newspaper plant not normally attended at night, whereby to notify the proprietor during the night in the event that a power or fuel failure has extinguished the burners heating a vat of molten lead used in type bars, in order that he may go to the plant and correct the difficulty before the lead solidifies. The vat of lead requires several hours to melt, and solidification during the night would result in loss of much valuable time in the following day. However, it will become readily apparent that the device has a multiciplicity of uses, in that the sensing element thereof may be of the types responsive to many different stimuli. For example, the sensing element could be, as described above, thermostatic in nature whereby to respond to any temperature change in any environment. It could be pressure-sensitive to respond to changes of pressure in a piping system or other element. It could be photoelectric to respond to any change of lighting. It could be purely electrical whereby to respond, for example, to any failure of an electric circuit. It could be motion-sensitive, whereby to respond to physical movement of any body, such as a window or door, as might be used when utilizing the device as a burglar alarm. These as well as many other possible uses will readily suggest themselves.

The device is specifically adapted for use with a "card-dialer" telephone, this being the well-known type of telephone operable to dial automatically any telephone number indicated by pre-punched holes in a card insertable in a slot of the telephone instrument. In the present device, the user simply inserts a card punched with the number of the telephone to which he desires the warning call to be transmitted.

Among numerous additional objects of the present invention are the provision of a device of the character described which will make a call lasting for a predetermined short time, such as one minute, then terminate the call; which may be set selectively to make only one call even if the emergency control condition continues to exist, to repeat the call at pre-determined longer intervals, such as every forty-five minutes, as long as the emergency condition exists, or to repeat the call continuously at said longer intervals even if the emergency condition ceases to exist, all as the particular emergency condition being indicated and the remedial steps to be taken may render desirable; which may be set selectively either to cause a distinctive audible signal to be transmitted over the telephone in order that the receiver of the call may identifiy it, or to transmit over the telephone sounds picked up at the emergency station by a listening microphone which may be remote from the telephone instrument, which may be extremely useful if the specific nature or degree of the emergency can be evaluated by listening; which may if desired be shut off by the person at the receiving phone by his uttering a distinctive sound into the mouthpiece, even if the device has previously been set for the repeating or continuous operations described above; which requires no connection with or alteration of the internal wiring of the telephone; and which will not interfere with normal usage of the telephone.

Figure 8:
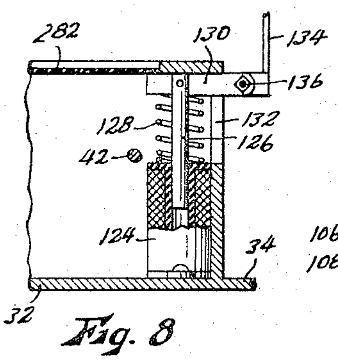
Figure 9:
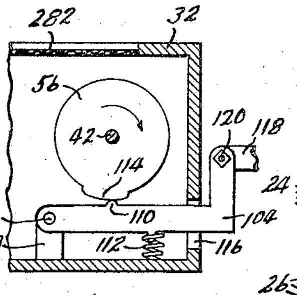
Figure 10:
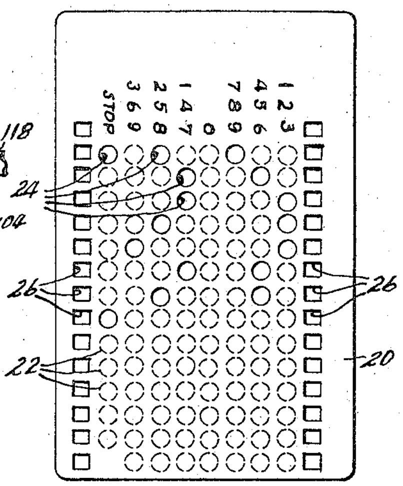
Figure 11:
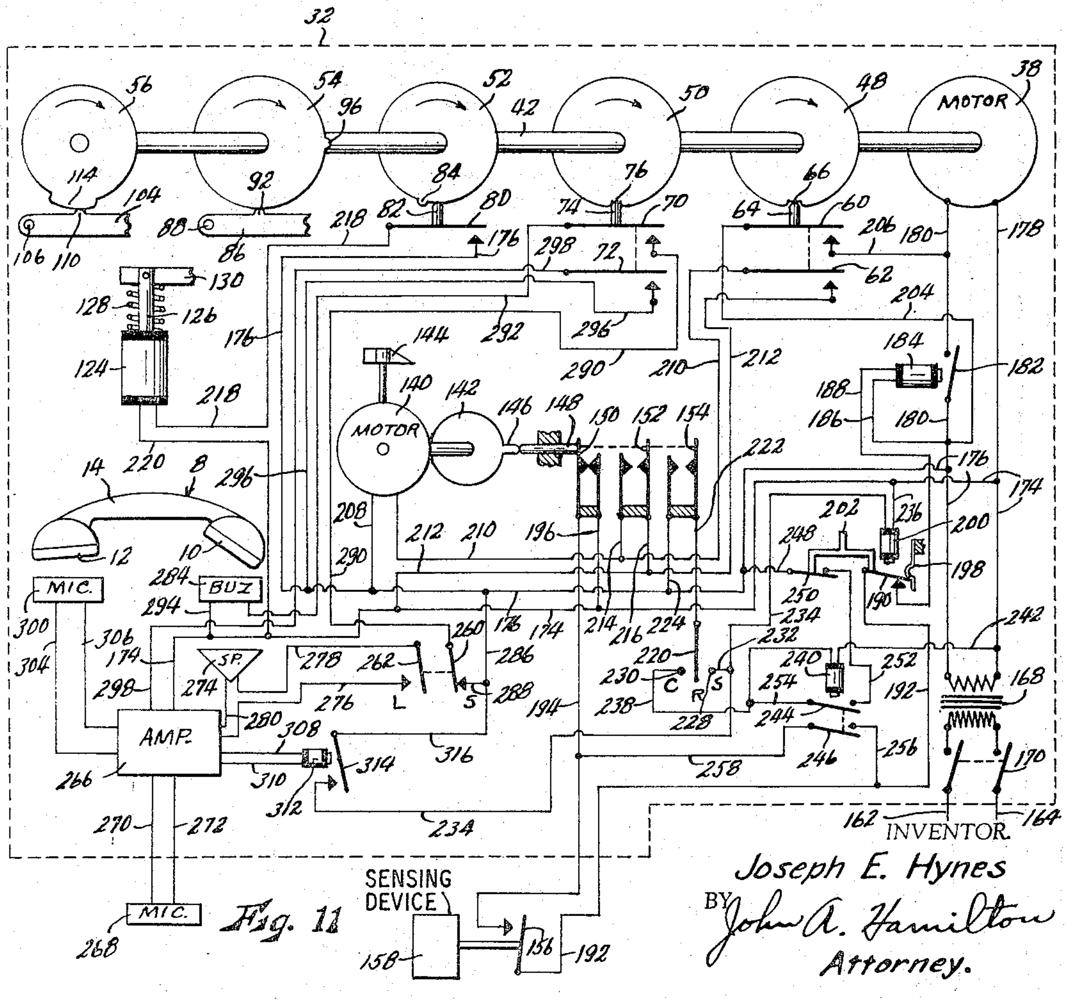

With these objects in view, as well as other objects which will appear in the course of the specification, reference will be had to the accompanying drawing, wherein:

FIG. 1 is a top elevational view of a telephone warning device embodying the present invention, shown in operative relationship to a "card dialer" telephone, with parts broken away, FIG. 2 is a fragmentary side elevational view of the parts as shown in FIG. 1, FIG. 3 is a fragmentary sectional view taken on line III—III of FIG. 2, FIG. 4 is a fragmentary sectional view taken on line IV—IV of FIG. 3, FIG. 5 is a fragmentary sectional view taken on line V—V of FIG. 3, FIG. 6 is a fragmentary sectional view taken on line VI—VI of FIG. 3, FIG. 7 is a fragmentary sectional view taken on line VII—VII of FIG. 3, FIG. 8 is a fragmentary sectional view taken on line VIII—VIII of FIG. 3, FIG. 9 is a fragmentary sectional view taken on line IX—IX of FIG. 3, FIG. 10 is a face view of a dialing card suitable for use with the telephone, and FIG. 11 is a schematic wiring diagram of the warning device.

Like reference numerals apply to similar parts throughout the several views, and the numeral 2 applies generally to a telephone of the "card dialer" type. This telephone is adapted also for use as a standard telephone, including a base 4 having the usual dialing mechanism 6 at the upper surface thereof, a handset 8 having a mouthpiece 10 and earpiece 12 attached to opposite ends of a handle 14, and a vertically movable cradle 16 adapted normally to support and be depressed by handset 8, whereby operating circuits of the telephone are broken, and biased to raise whenever the handset is lifted, whereby to ready the phone for use. In its particular nature as a "card dialer" telephone, which peculiarly adapts it for use with the present warning device, the telephone is also equipped with a slotted chute 18 into which a dialing card 20 such as shown in FIG. 10 may be inserted. As shown in FIG. 10, said card is provided with a series of horizontal rows of circular cuts 22 which may easily be punched out to form holes 24, the holes in each horizontal row corresponding to one letter or digit of any given phone number.

In use the card 20 is pressed all the way into chute 18, where it is held by an internal ratchet mechanism engaging rows of holes 26 in the vertical edges of the card. This must be done while cradle 16 is depressed. Then, after the cradle has been released and the dial tone established, the user presses a "Start" button 28 on the phone base, whereupon the internal ratchet mechanism feeds the card upwardly from chute 18 in steps corresponding to the spacing between horizontal rows of holes 24 of the card, and another internal mechanism "reads" the holes in each row and actuates the dialing mechanism, whereby the phone number punched in the card is called. The phone base is also provided with a "Release" button 30 whereby a card 20, once inserted in chute 18, may be released and removed without going through the dialing operation, but this is not pertinent to the present invention. This type of telephone is of course common and well known in the art.

The warning device forming the subject matter of the present invention includes a hollow box 32 having a shelf 34 projecting horizontally forwardly therefrom, said shelf being adapted to support the base 4 of the telephone instrument, and having low upstanding walls 36 surrounding said phone base whereby to secure it in fixed relation to box 32. Mounted on the top of box 32 is a cradle 46 in which handset 8 of the telephone is rested when the warning device is in use. Mounted in said box is an operating motor 38 operable through a speed reducer 40 to turn a horizontal shaft 42 at a low speed so that one revolution thereof corresponds to the desired duration of a phone call to be initiated by the device, say at one revolution per minute. It will be understood that FIGS. 3–9 and 11 show shaft 42 at its "rest" position before the initiation of a call. Shaft 42 may be supported in a bearing 44 affixed to a wall of box 32.

Mounted fixedly on shaft 42, so as to rotate therewith, are a series of three switch drums 48, 50 and 52, and a pair of cam drums 54 and 56. Mounted adjacent drum 48 is a switch housing 58 in which are mounted a pair of normally open switches 60 and 62 (see FIG. 11) which are operated by a plunger 64 extending outwardly from housing 58 and engaging the rim of drum 48, in which a notch 66 is formed. It will be understood that switches 60 and 62 are open when plunger 64 is engaged in notch 66, and closed when plunger 64 is engaged by any other portion of the drum rim. Similarly, a switch housing 68 mounted adjacent drum 50 carries a pair of normally open switches 70 and 72 which are operated by a plunger 74 extending outwardly from housing 68 and engaging the rim of drum 30, in which a notch 76 is formed, switches 70 and 72 being open only when said plunger is aligned with said notch. A third switch housing 78 is mounted adjacent drum 52, and carries a single normally open switch 80 operable by a plunger 82 extending outwardly from housing 78 and engaging the rim of drum 52, switch 80 being closed only when plunger 82 is engaged and depressed by a lobe 84 of the drum.

A lever 86 is pivoted at one end, as at 88, to a bracket 90 fixed in box 32 adjacent shaft 42, the pivotal axis being below and behind cam drum 54, and parallel to shaft 42. Said lever extends forwardly beneath drum 54, having a lobe 92 urged upwardly against said drum by a spring 94, and extending forwardly through a slot 96 in the forward wall of box 32. Drum 54 has a lobe 96 adapted to engage lever lobe 92 to depress lever 86 against spring 94. Attached to the extended end of lever 86 by a bolt 98 is the rearward end of an arm 100, said arm extending forwardly over the telephone instrument and having affixed to its forward end a foot 102 disposed directly above "Start" button 28, whereby said button is depressed whenever lever 86 is depressed by drum lobe 96. A lever 104 is pivoted at one end, as at 106, to a bracket 108 fixed in box 32 below and behind shaft 42, said lever extending forwardly beneath cam drum 56, having a lobe 110 urged upwardly against the rim of drum 56 by a spring 112, said drum rim having a lobe 114 adapted to engage lever lobe 110 to depress lever 104 against spring 112. Lever 104 extends forwardly through a slot 116 formed in the forward wall of box 32, and has the rearward end of an arm 118 affixed to the extended end thereof by a bolt 120. Said arm extends forwardly, and is provided at its forward end with a foot 122 disposed directly above handset cradle 16 of the phone instrument, whereby said cradle is depressed by said foot whenever lever 104 is depressed by drum lobe 104.

Also mounted in box 32 is a vertical solenoid 124, the armature 126 of which is normally held yieldably in an elevated position by a spring 128, but which is lowered against said spring whenever the coil of the solenoid is energized. Affixed to the upper end of said armature is a horizontal bar 130 which extends forwardly through a slot 132 of the box and has an arm 134 affixed to the extended end thereof by a bolt 136, said arm extending forwardly and being provided at its forward end with a foot 138 disposed directly above card chute 18 of the phone instrument. Said foot is disposed far enough above a card 20 disposed in said chute to allow said card to rise during the dialing operation, but will reinsert said card fully down into said chute whenever solenoid 124 is energized. When the warning device is not in use, bolts 98, 120 and 136 may be loosened and arms 100, 118 and 134 pivoted upwardly and rearwardly, whereby to leave the telephone instrument unobstructed for normal usage.

Referring to FIG. 11, it will be seen that another element of the device is a timing mechanism including an electric clock motor 140 operable to drive a drum 142 so that said drum revolves once in the time desired between calls to be made by the device, it being understood that the device will make calls repeatedly at said intervals to insure a warning to the user in the event he is not at the called number when the first call is made. As shown, motor 140 is of variable speed controlled by a knob 144 disposed externally of box, whereby to rotate drum 142 once in any period from 5 minutes to one hour, as desired. Drum 142 carries a lobe 146 which at one time in each revolution of the drum engages and presses a plunger 148 which operates three switches 150, 152 and 154. It will be understood that switch 150 is closed and switches 152 and 154 are opened when lobe 146 engages plunger 148, while switch 150 is open and switches 152 and 154 are closed when lobe 146 moves out of engagement with plunger 148. The device also includes a control switch 156, normally open, adapted to be closed by a sensing device 158 operable to close switch 156 in response to an emergency condition. As previously described, said sensing device may be a thermostat, pressure gauge, motion apparatus, or any other device responsive to the emergency condition of which it is desired to give warning. As shown in FIG. 1, switch 156 and sensing device 158 are enclosed in a single housing 160 which may be disposed at any desired position remote from box 32 and the telephone instrument.

Operating electric power is fed to the device through a pair of line wires 162 and 164 which may be connected to the usual 110 volt electric outlet by means of a standard plug 166 as shown in FIG. 1, said line wires being connected to the primary terminals of a transformer 168 through an "On-Off" switch 170 operable by a manual lever 172 extending exteriorly of box 32 (see FIG. 1). Said transformer reduces the voltage to a level suitable for operating the device, such as 12 or 24 volts, and the secondary lead wires thereof are shown at 174 and 176. Operating motor 38 is connected to said lead wires by wires 178 and 180 respectively, wire 180 being interrupted by a normally open relay switch 182 operable to be closed whenever electromagnet 184 is energized.

Whenever the emergency condition to which sensing device 158 is sensitive occurs, switch 156 is closed. This completes a control circuit from lead wire 176 through wires 180 and 186, electromagnet 184, wire 188, a lockout switch 190, wire 192, control switch 156, wire 194, timer switch 150 (then closed) and wire 196 to lead wire 174. Switch 190 is adapted to be yieldably retained in either its open or its closed position by a spring detent 198, being operable to be opened by energizing an electromagnet 200, and to be closed by a manual "Reset" button 202 accessible from the exterior of box 32 (see FIG. 1). The control circuit, thus completed, energizes electromagnet 184 and closes switch 182, closing the circuit of operating motor 38 and setting it in operation. Immediately drum 48, caused to start rotating by the operation of the motor, closes switch 60, which completes a holding circuit for said motor from lead wire 176 through wires 180 and 204, switch 60, wires 206 and 180, motor 38 and wire 178 to lead wire 174, whereby motor 38 is continued in operation until shaft 42 has completed one full revolution and notch 66 of drum 48 again permits switch 60 to open. During the one full revolution of shaft 42 it manipulates the arms 100, 118 and 134 to complete a call, as will be more fully described below.

Drum 48 closes switch 62 simultaneously with switch 60, and the closure of switch 62 completes an operating circuit to timer motor 140 from lead wire 176 through wire 208, motor 140, wire 210, switch 62 and wire 212 to lead wire 174, setting motor 140 in operation. It will be continued in operation by switch 62 for the full revolution of shaft 42 (one minute in the example given). By that time, motor 140 has turned lobe 146 out of engagement with plunger 148, allowing switch 150 to open and switches 152 and 154 to close. The closure of switch 152 closes a holding circuit for motor 140 from line wire 176 through wire 208, motor 140, wires 210 and 214, switch 152 and wires 216 and 212 to lead wire 174, whereby said motor is continued in operation as long as switch 152 is closed, or until timer drum 142 has completed one full revolution (5 minutes to one hour in the example given). The opening of switch 150 breaks the control circuit previously described so that relay switch cannot be closed, so that shaft 42 must stop after one full revolution when drum 48 again opens switch 60. When timer drum completes one full revolution it again closes switch 150 and opens switches 152 and 154. The opening of switch 152 interrupts the holding circuit of motor 140 and brings the system to rest, unless at that time control switch 156 is still closed, indicating a continuing emergency. In that event, closure of switch 150 again completes the control circuit to close switch 182 and thus initiate a whole new calling and timing cycle, which will be repeated indefinitely as long as control switch 156 remains closed in response to a continuing emergency. This may be termed a "Repeat" operation in that it will place a one minute call at intervals of 5 minutes to one hour, as long as the emergency condition exists as indicated by closure of switch 192.

The calling cycle represented by each revolution of shaft 42 is substantially as follows: Immediately after motor 38 starts, lobe 114 of drum 56 moves out of engagement with lobe 110 of lever 104, allowing said lever to be raised by spring 112, to elevate foot 122 of arm 118, whereby cradle 16 of the telephone instrument is allowed to rise, thus effectively "lifting the receiver." After a time lapse ample to allow the dial tone to be established (about 15 seconds as shown), lobe 96 of drum 54 engages lobe 92 of lever 86 to depress said lever momentarily, thus causing foot 102 of arm 100 to depress the "Start" button 28 of the telephone instrument, thus initiating the automatic dialing operation of the instrument as previously described. In readying the device for use, the operator of course inserts in chute 18 a card 20 punched with the number of the telephone to which he desires the warning calls to be made. Then, when the revolution of shaft 42 is nearly complete, lobe 114 of drum 54 again depresses lever 104 to depress cradle 16, thereby "hanging up" the telephone. Immediately thereafter, lobe 84 of drum 52 depresses plunger 82 momentarily to close switch 80. This completes a circuit from lead wire 176 through switch 80, wire 218, solenoid coil 124 and wire 220 to lead wire 174. Coil 124, thus energized, lowers armature 126 against spring 128 to cause foot 138 to again press card 20 into chute 18 to ready the phone for another call. As previously mentioned, the card must be depressed after cradle 16 is depressed, in the usual card dialer telephone. Immediately after the card is depressed, shaft 42 stops due to the opening of switch 60, with lobe 114 of drum 56 still engaging lobe 110 of lever 104 to depress cradle 16.

Besides the "Repeat" action described above, the device may also be set for a "Single" action wherein the device will place only a single call and then remain inoperative until reset regardless of the continuation of the emergency condition causing control switch 156 to close, and a "Continuous" action in which the device will continue to make calls at the set intervals even if the emergency condition ceases to exist and switch 156 opens. These types of operation may be desired depending on the nature of the emergency and the immediacy of the remedial action to be taken. These actions utilize a switch 220 connected through wire 222, timer switch 154 and wire 224 to lead wire 176. Switch 220, operable by a manual lever 226 accessible at the top of box 32 (see FIG. 1) may be closed selectively either on contact 228 to provide "Single" action, or on contact 230 to provide "Continuous" action, and also has a central open position to provide the "Repeat" action already described. If it is closed on contact 228, and if a timer cycle is initiated as previously described, timer switch 154 closes. This completes a circuit from line wire 176 through wire 224, switch 154, wire 222, switch 220, wires 232 and 234, electromagnet 200 of switch 190, and wire 236 to lead wire 174. Magnet 200, thus energized, opens switch 190, and said switch is held open by detent 198. This interrupts the control circuit so that no new calling cycle can be initiated even if control switch 156 remains closed, until reset button 202 is pushed manually. This is the "Single" action.

If selector switch 220 is closed on contact 230, and if a timer cycle is initiated as before, switch 154 closes, and a circuit is completed from lead wire 176 through wire 224, switch 154, wire 222, switch 220, wire 238, electromagnet 240 and wire 242 to lead wire 174. Magnet 240, thus energized, closes a pair of normally open relay switches 244 and 246. Closure of switch 244 completes a holding circuit from lead wire 176 through wire 248, a normally closed switch 250 which may be opened momentarily by pressing reset button 202, wire 252, switch 244, wires 254 and 234, magnet 240 and wire 242 to lead wire 174, whereby switches 244 and 246 will remain closed continuously even when timer switch 154 opens at the end of each timer cycle, until reset button 202 is depressed to de-energize magnet 240. Closure of switch 246 allows the control circuit to be completed from lead wire 176 through wires 180 and 186, magnet 184, wire 188, switch 190, wires 192 and 256, switch 246, wires 258 and 194, timer switch 150 and wire 196 to lead wire 174, by-passing control switch 156. Thus the control circuit will be completed each time timer switch 150 closes, and a new cycle thus initiated, even if the emergency indicated by closure of control switch 156 should cease to exist. This the "Continuous" action.

Also provided is means whereby selectively to sound an audible signal which may be used to identify the call to any person answering at the number called, in order to distinguish the source of the call, or to provide means whereby the person receiving the call may listen to whatever sounds may emanate from the source of the emergency, in order to assist in identifying and evaluating the extent of the emergency, if indeed the emergency condition is such as will normally be accompanied by sounds. This means includes a pair of switches 260 and 262 interconnected so as to be operable by a single lever 264 accessible at the top of box 32 (see FIG. 1). When said lever is moved in one direction, labelled "Signal" switch 260 is closed and switch 262 is open. When the lever is moved in the opposite direction, labelled "Listen," switch 260 is open and switch 262 is closed. Also included is a two-channel electronic amplifier 266 having a microphone 268 connected to the input, of one of the channels thereof by wires 270 and 272. This microphone may be disposed remotely from box 32 so as to be directly adjacent the source of any noise which might be expected to occur as a result of an emergency. The output of this channel of the amplifier is connected to a loudspeaker 274 in a circuit including wire 276, switch 262, wire 278, speaker 274 and wire 280. Speaker 274 may be disposed in box 32 beneath mouthpiece 10 of the telephone when handset 8 is supported in cradle 46 of the box the top of the box being provided with a sound permeable grill 282 for this purpose. Also positioned in box 32 beneath grill 282 is an electric buzzer 284 or other electrically actuated audible signal.

When calling cycle is initiated as previously described, causing rotation of shaft 42, drum 50 of said shaft immediately closes switches 70 and 72, and maintains them closed until shaft 42 completes its cycle. Assuming then that selector switch 260 has been closed, closure of switch 70 completes a circuit from lead wire 176 through wires 286 and 288, switch 260, wire 290, switch 70, wire 292, buzzer 284 and wire 294 to lead wire 174, thus creating a sound which may be heard over the telephone. The sound may be distinctive, such as by making it intermittent or patterned, to identify the source of the call readily to the person receiving the call. Closure of switch 72 completes a circuit from lead wire 176 through wire 296, switch 72, wire 298, and amplifier 266 to lead wire 174, thus turning said amplifier on, though it is inoperative at this time to operate speaker 274 since switch 262 is open. On the other hand, if selector lever 264 has been set to open switch 260 and close switch 262, buzzer 284 will be deactivated and the speaker 274 will be set in operation to allow the person receiving the call to listen carefully to any sounds picked up by microphone 268. In some types of emergencies, this may be extremely helpful in evaluating the nature or the extent of an emergency. Amplifier 266 is turned on even when buzzer 284 is in use, for a purpose to be described.

Finally, there is provided means whereby the person receiving a call placed by the device may, if he so desires, turn the device off so that it will not continue to repeat the call at intervals. He may wish to do so, for example, in the event that he determines the emergency is one which may safely be ignored, or in which he may have taken the necessary remedial steps other than by personal attendance at the site of the emergency, as by calling a night watchman at the site. This means includes a second microphone 300 disposed in box 32 beneath a second grill 302 in the top wall thereof, so as to receive sounds from the earpiece 12 of the telephone handset, and being connected to the input of the second channel of amplifier 266 by wires 304 and 306. The output of said second channel is connected by wires 308 and 310 to an electromagnet 312 operable when energized to close a normally open switch 314. The second channel of the amplifier is preferably filtered to be responsive only to a highly distinctive sound received by microphone 300 to energize magnet 312, such as a high pitched whistle, so that said magnet will not be energized by the sound of buzzer 284 or any other sound normally likely to be received by microphone 300. When, during any call, the person receiving the call utters this distinctive sound, magnet 312 will be energized to close switch 314. This completes a circuit from lead wire 176 through wires 286 and 316, switch 314, wire 234, electromagnet 200 and wire 236 to lead wire 174. Magnet 200, thus energized, opens switch 190 to interrupt the control circuit so that no subsequent call can be initiated, as previously described, until reset button 202 is again pushed to close switch 190. It will be understood that all of the parts diagramed in FIG. 11, with the exception of control switch 156, sensing device 158 and microphone 268 are enclosed in box 32, and that said box may be of any size necessary to accommodate said parts.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A telephone warning device for use in connection with a card-dialing telephone including a base and a handset, said base including a cradle normally depressed by said handset to break the operating circuits of the phone when not in use, a card chute adapted to receive therein a card pre-punched with any desired telephone number, and a start button operable when pushed after said cradle has been released to "read" said card and automatically dial the pre-punched telephone number thereof, during which dialing operation said card is partially ejected from said chute, said warning device comprising:

(a) an operating mechanism adapted to be disposed adjacent said telephone and including three arms extending toward said telephone to points respectively adjacent the handset cradle, start button and card chute of said telephone, said mechanism being operable when activated to perform a series of operations in an operating cycle of predetermined length and including the steps of first releasing said cradle, then depressing said start button after a predetermined time lapse, then depressing said cradle after a still further predetermined time lapse, and finally pressing said card into said chute,
(b) electrically operable activating means for activating said operating mechanism to perform one of said operating cycles,
(c) a control switch,
(d) a sensing device operable to close said control switch in response to any condition to which said sensing device is sensitive, and
(e) an operative electric control circuit including said activating means and said control switch.

2. A telephone warning device as recited in claim 1 with the addition of:

(a) a timer mechanism operable when actuated to go through a cycle of operation of a predetermined length greater than the cycle of operation of said operating mechanism,
(b) a timer switch disposed in said control circuit and operable by said timer mechanism to be closed when said timer mechanism is not activated, and to be opened at the beginning and closed at the end of the cycle of operation of said timer mechanism, and
(c) means operable by said operating mechanism at the start of the operating cycle thereof to activate said timer mechanism.

3. A telephone warning device as recited in claim 2 with the addition of:

(a) a normally closed lock-out switch disposed in said control circuit,
(b) electrically operable switch operating means for opening said lock-out switch,
(c) a second timer switch operable by said timer mechanism to be open when said timer mechanism is not activated, and to be closed at the beginning and opened at the end of the cycle of said timer mechanism,
(d) an operative electrical circuit including said switch operating means and said second timer switch, and
(e) manually operable means for closing said lock-out switch.

4. A telephone warning device as recited in claim 2 with the addition of:

(a) a conductor by-passing said control switch in said control circuit,
(b) a normally open by-pass switch in said conductor,
(c) electrically operable means for closing said by-pass switch,
(d) a normally open holding switch also operable to be closed by the operating means of said by-pass switch,
(e) a second timer switch operable by said timer mechanism to be open when said timer mechanism is not activated, and to be closed at the beginning and opened at the end of the cycle of said timer mechanism,
(f) an operative electrical circuit including said second timer switch and the operating means of said by-pass switch,
(g) a normally closed reset switch,
(h) an operative electric circuit including said operating means for said by-pass switch, said holding switch, and said reset switch, and
(i) manually operable means for opening said reset switch.

5. A telephone warning device as recited in claim 2 with the addition of:

(a) a second timer switch operable by said timer mechanism to be open when said timer mechanism is not activated, and to be closed at the beginning and opened at the end of the cycle of said timer mechanism,
(b) a normally closed lock-out switch disposed in said control circuit,
(c) electrically operable switch operating means for opening said lock-out switch,
(d) a first selector circuit including said operating means of said lock-out switch and said second timer switch,
(e) a conductor by-passing said control switch in said control circuit,
(f) a normally open by-pass switch in said conductor,
(g) electrically operable means for closing said by-pass switch,
(h) a normally open holding switch also operable to be closed by the operating means of said by-pass switch,
(i) a second selector circuit including said second timer switch and said operating means of said by-pass switch,
(j) a normally closed reset switch,
(k) a holding circuit including said operating means for said by-pass switch, said holding switch, and said reset switch,
(l) a selector switch operable selectively to complete either of said selector circuits, or to break both of said selector circuits, and
(m) manually operable means for simultaneously opening said reset switch and closing said lock-out switch.

6. A telephone warning device as recited in claim 1 with the addition of:

(a) an electrically operable audible signal device adapted to be positioned adjacent the mouthpiece of the handset of said telephone,
(b) an operating electric circuit for said signal device,
(c) a normally open switch in said last named circuit, and
(d) means operable by said operating mechanism to close said last named switch at the beginning of the operating cycle of said operating mechanism and to open said switch at the end of said operating cycle.

7. A telephone warning device as recited in claim 1 with the addition of:

(a) an electronic amplifier, (b) an operative electric circuit for said amplifier,
(c) a microphone electrically connected to the input of said amplifier, and
(d) a loudspeaker electrically connected to the output of said amplifier and adapted to be positioned adjacent the mouthpiece of the handset of said telephone.

8. A telephone warning device as recited in claim 6 with the addition of:

(a) an electronic amplifier,
(b) an operative electric circuit for said amplifier,
(c) a microphone electrically connected to the input of said amplifier, and
(d) a loudspeaker electrically connected to the output of said amplifier and adapted to be positioned adjacent the mouthpiece of the handset of said telephone.

9. A telephone warning device as recited in claim 8 with the addition of:

(a) a manually operable selector switch operable selectively to deactivate either said audible signal device or said loudspeaker.

10. A telephone warning device as recited in claim 8 with the addition of:

(a) a normally open switch in the operating circuit of said amplifier, and
(b) means operable by said operating mechanism to close said last named switch at the beginning of the operating cycle of said operating mechanism and to open said switch at the end of said operating cycle.

11. A telephone warning device as recited in claim 1 with the addition of:

(a) a normally closed look-out switch in said control circuit,
(b) electrically operable means for opening said lock-out switch,
(c) an electronic amplifier,
(d) an operative electrical circuit for said amplifier,
(e) a microphone electrically connected to the input of said amplifier and adapted to be positioned adjacent the earpiece of the handset of said telephone whereby to receive sounds therefrom,
(f) a normally open switch,
(g) electrically operable means for closing said last named switch, electrically connected to the output of said amplifier,
(h) a lock-out circuit including said last named switch and said lock-out switch, and
(i) manually operable means for closing said lock-out switch.

12. A telephone warning device as recited in claim 11 wherein said amplifier has two channels each with an input and an output, said microphone and said switch operating means being connected respectively to the input and output of the first of said channels, and with the addition of:

(a) a second microphone connected to the input of the second channel of said amplifier, and
(b) a loudspeaker connected to the output of said second amplifier channel and adapted to be positioned adjacent the mouthpiece of the handset of said telephone, said first amplifier channel being nonresponsive to sounds normally likely to be received by said second microphone.

References Cited

UNITED STATES PATENTS

| | | | |
|---|---|---|---|
| 3,095,478 | 6/1963 | Adams | 179—5 |
| 3,131,260 | 4/1964 | Evans | 179—5 |

JOHN W. CALDWELL, *Primary Examiner.*

J. T. STRATMAN, *Assistant Examiner.*